US012500663B2

(12) United States Patent
Mansour et al.

(10) Patent No.: US 12,500,663 B2
(45) Date of Patent: Dec. 16, 2025

(54) DYNAMIC BEAM BLANKING AND SPECTRUM RESERVATION FOR DIRECT TO CELL MOBILE SATELLITE COMMUNICATIONS

(71) Applicant: T-MOBILE INNOVATIONS LLC, Overland Park, KS (US)

(72) Inventors: Nagi A. Mansour, Arlington, VA (US); Akin Ozozlu, McLean, VA (US); Ferdinand Bacay Saulon, Issaquah, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 317 days.

(21) Appl. No.: 18/239,525

(22) Filed: Aug. 29, 2023

(65) Prior Publication Data
US 2025/0080205 A1   Mar. 6, 2025

(51) Int. Cl.
*H04B 7/185*   (2006.01)
(52) U.S. Cl.
CPC ..... *H04B 7/18513* (2013.01); *H04B 7/18534* (2013.01); *H04B 7/18539* (2013.01)
(58) Field of Classification Search
CPC ............ H04B 7/18513; H04B 7/18534; H04B 7/18539
USPC ........................................................ 455/428
See application file for complete search history.

(56) References Cited

U.S. PATENT DOCUMENTS

| | | | | |
|---|---|---|---|---|
| 11,799,544 | B1 * | 10/2023 | Nuttall | H04W 56/0045 |
| 2013/0331026 | A1 * | 12/2013 | O'Neill | H04W 88/16 |
| | | | | 455/12.1 |
| 2023/0300776 | A1 * | 9/2023 | Duan | H04B 7/0695 |
| | | | | 455/456.1 |
| 2024/0063894 | A1 * | 2/2024 | Vogedes | H04B 7/18504 |
| 2024/0097778 | A1 * | 3/2024 | Han | H04B 7/18517 |
| 2024/0187085 | A1 * | 6/2024 | Mcmenamy | H04B 7/15507 |

(Continued)

FOREIGN PATENT DOCUMENTS

CN    111416648 A  *  7/2020  ......... H04B 7/18523

OTHER PUBLICATIONS

Weibiao et al. (Dynamic Beam Hopping of Double LEO Multi-beam Satellite based on Determinant Point Process); IEEE 2022; 6 pages. (Year: 2022).*

(Continued)

*Primary Examiner* — Hirdepal Singh
(74) *Attorney, Agent, or Firm* — Shook Hardy & Bacon L.L.P.

(57) ABSTRACT

A method of dynamic beam blanking in a network including an aerospace access point is provided. Multiple antenna beams may be provided in addition to a primary antenna beam. First a determination of an antenna beamwidth of a primary antenna beam is made. The antenna beamwidth is based on a usage threshold of the primary antenna beam. When the antenna beamwidth is above the usage threshold at least one dynamic antenna beam blanking commend is generated for at least one first neighboring co-channel antenna beam used by at least one second user device. The second user device is then directed to at least one second neighboring co-channel antenna beam that is not affected by the dynamic antenna beam blanking command. The blanked first neighboring co-channel antenna beam is then added to the primary antenna beam.

20 Claims, 6 Drawing Sheets

(56) References Cited

U.S. PATENT DOCUMENTS

2024/0259977 A1\* 8/2024 Yu .................... H04W 56/0045
2024/0291143 A1\* 8/2024 Dankberg .......... H04B 7/18519

OTHER PUBLICATIONS

Jędrzej Stańczak (Conditional Handover in 5G—Principles, Future Use Cases and FR2 Performance); IEEE 2022; 6 pages. (Year: 2022).\*

\* cited by examiner

DYNAMIC BEAM BLANKING AND SPECTRUM RESERVATION FOR DIRECT TO CELL MOBILE SATELLITE COMMUNICATIONS

TECHNICAL BACKGROUND

The present disclosure generally relates to dynamic beam blanking and spectrum reservation for direct to cell mobile satellite communications. When a user device uses a portion of a radio frequency spectrum to communicate with an aerospace access point such as a deployed and orbiting satellite, the current implementations use a static frequency bandwidth. The static frequency bandwidth is assigned to neighboring beams, such as f1, f2, f3, and f4. The primary beam needs an amount of bandwidth to provide service to devices communicating with the aerospace access point. The static bandwidth assigned may not be sufficient to provide adequate bandwidth for successful communication with the aerospace access point.

SUMMARY

A high-level overview of various aspects of the invention are provided here to offer an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In one aspect, a method of dynamic beam blanking in a network is provided. The network may include an orbiting aerospace access point and may incorporate multiple antenna beams in addition to a primary antenna beam. The method begins with determining an antenna beamwidth of a primary antenna beam that is used for communications between a first user device and an orbiting apparatus, which may be known as an aerospace access point. The antenna beamwidth is based on a usage threshold of the primary antenna beam. The usage threshold may use a number of users and a predetermined number of users above which communication with the aerospace access point may be adversely affected. When the antenna beamwidth is above the usage threshold at least one dynamic antenna beam blanking commend is generated for at least one first neighboring co-channel antenna beam used by at least one second user device. The second user device is then directed to at least one second neighboring co-channel antenna beam that is not affected by the dynamic antenna beam blanking command. The blanked first neighboring co-channel antenna beam is then added to the primary antenna beam of the orbiting access point when directed by the network.

In another aspect, a method of dynamic beam blanking in network is provided. The method begins when a user device transmits at least one uplink message to an aerospace access point at least one uplink message using a primary antenna beam. The user device may then receive a dynamic beam blanking instruction from the aerospace access point to add at least one neighboring co-channel antenna beam to the primary antenna beam.

In yet another aspect, a non-transitory computer storage media storing computer-usable instructions is provided. The instructions, when used by one or more processors, cause the processor to determine an antenna beamwidth of a primary antenna beam between a first user device that communicates directly with an apparatus when the apparatus is in orbit. The antenna beamwidth may be based on a usage threshold of the primary antenna beam. When the antenna beamwidth is above the usage threshold, at least one first dynamic antenna beam blanking command is generated by the processor. The first dynamic antenna beam blanking commend blanks at least one neighboring co-channel antenna beam used by at least one second user device when directed by the network. The second user device may be directed to at least one second neighboring co-channel antenna beam not affected by the dynamic antenna beam blanking command. The at least one dynamically blanked co-channel antenna beam is then added to the primary antenna beam of the orbiting access point, when a network instruction is issued.

BRIEF DESCRIPTION OF THE DRAWINGS

Aspects are described in detail below with reference to the attached drawings figures, wherein.

DETAILED DESCRIPTION

Figure 1:
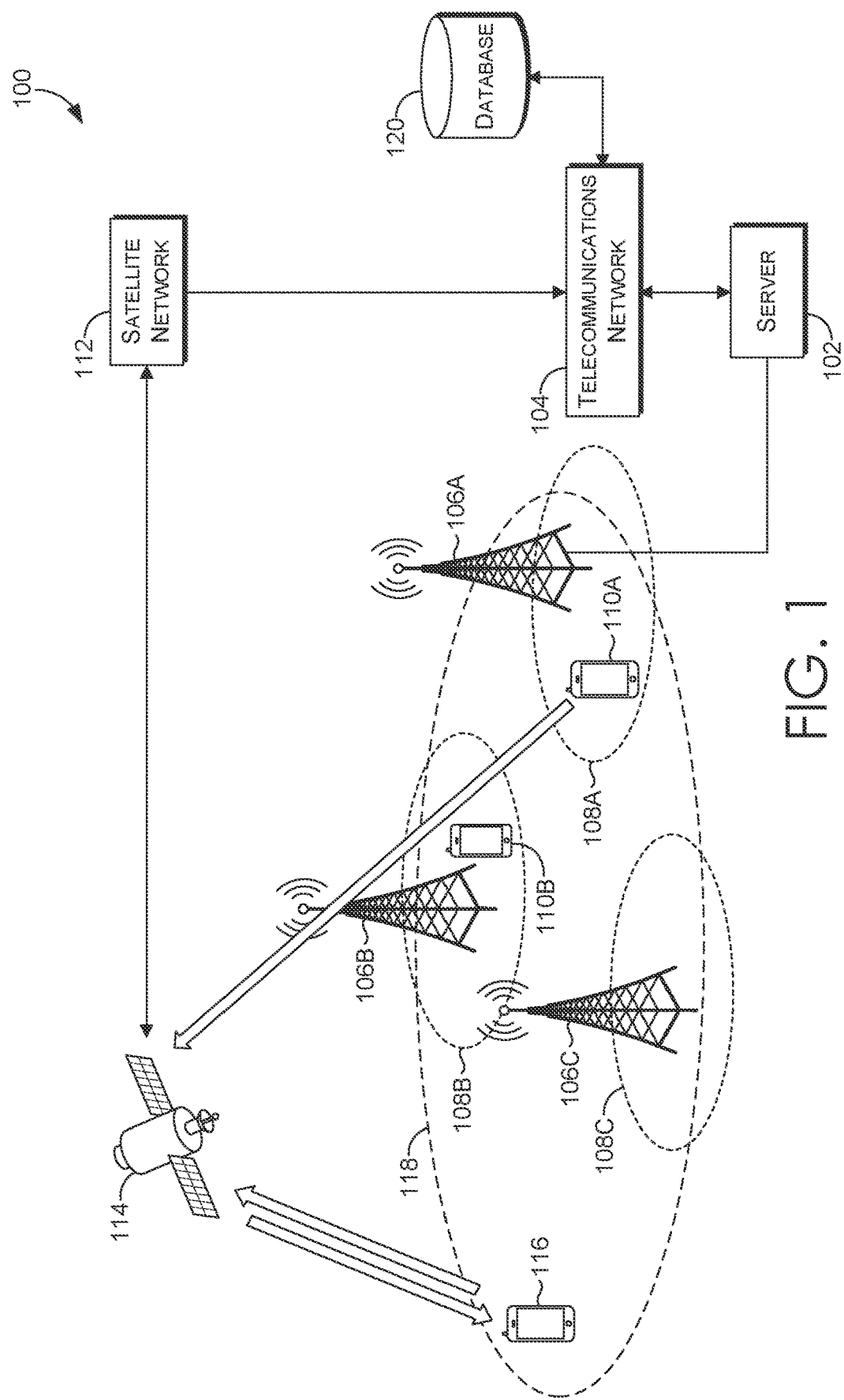
FIG. 1 depicts an example of a system, in accordance with one or more embodiments.

The subject matter of the present invention is being described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of systems and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments and aspects set forth herein.

Throughout this disclosure, several acronyms and shorthand notations are used to aid the understanding of certain concepts pertaining to the associated system and services.

These acronyms and shorthand notations are intended to help provide an easy methodology of communicating the ideas expressed herein and are not meant to limit the scope of the present invention. The following is a list of these acronyms:

| | |
|---|---|
| 3G | Third-Generation Wireless Access Technology |
| 4G | Fourth-Generation Wireless Access Technology |
| 5G/5G NR | Fifth-Generation Wireless Access Technology/New Radio |
| 5GC | Fifth-Generation Wireless Access Technology Core Network |
| AAU | Active Antenna Unit |
| BRS | Broadband Radio Service |
| CD-ROM | Compact Disk Read Only Memory |
| CDMA | Code Division Multiple Access |
| CU | Central Unit |
| DU | Distribution Unit |
| EIRP | Equivalent Isotropically Radiated Power |
| eNodeB | Evolved Node B |
| EVDO | Evolution-Data Optimized |
| GIS | Geographic/Geographical/Geospatial Information System |
| gNodeB/gNB | Next Generation Node B |
| gNB CU | Next Generation Node B Central Unit |
| gNB DU | Next Generation Node B Distribution Unit |
| GPRS | General Packet Radio Service |
| GSM | Global System for Mobile Communication |
| iDEN | Integrated Digital Enhanced Network |
| DVD | Digital Versatile Disc |
| EEPROM | Electrically Erasable Programmable Read-Only Memory |
| FD-MIMO | Full Dimension Multiple-Input Multiple-Output |
| IOT | Internet of Things |
| IIOT | Industry Internet of Things |
| LED | Light Emitting Diode |
| LTE | Long Term Evolution |
| MEC | Mobile Far Edge Computer |
| MD | Mobile Device |
| MIMO | Multiple-Input Multiple-Output |
| mMIMO | Massive Multiple-Input Multiple-Output |
| MMU | Massive Multiple-Input Multiple-Output Unit |
| mmWave | Millimeter Wave |
| NEXRAD | Next-Generation Radar |
| NR | New Radio |
| OOBE | Out-of-Band-Emission |
| OTN | Optical Transport Network |
| PC | Personal Computer |
| PCS | Personal Communications Service |
| PDA | Personal Digital Assistant |
| PLMN | Public Land Mobile Network |
| PRB | Physical Resource Block |
| vPRB | Virtualized Physical Resource Block |
| RAN | Radio Access Network |
| RAM | Random Access Memory |
| RET | Remote Electrical Tilt |
| RF | Radio-Frequency |
| RFI | Radio-Frequency Interference |
| RIC | Radio Intelligent Controller |
| RLF | Radio Link Failure |
| R/N | Relay Node |
| RNR | Reverse Noise Rise |
| ROM | Read-Only Memory |
| RRU | Remote Radio Unit |
| RSRP | Reference Signal Receive Power |
| RSRQ | Reference Signal Receive Quality |
| RSSI | Received Signal Strength Indicator |
| RU | Radio Unit |
| SINR | Signal-to-Interference-&-Noise Ratio |
| SNR | Signal-to-Noise Ratio |
| SON | Self-Organizing Networks |
| TDMA | Time Division Multiple Access |
| TXRU | Transceiver (or Transceiver Unit) |
| UE | User Equipment |
| UMTS | Universal Mobile Telecommunications System |
| UTRAN | UMTS Radio Access Network |
| E-UTRAN | Evolved Universal Mobile Telecommunications System |
| WCD | Wireless Communication Device (interchangeable with UE) |
| WLAN | Wireless Local Area Network |
| XR | Extended Reality |

Further, various technical terms are used throughout this description. An illustrative resource that fleshes out various aspects of these terms can be found in Newton's Telecom Dictionary, 32nd Edition (2022).

Aspects herein may be embodied as, among other things: a method, system, or set of instructions embodied on one or more computer-readable media. Aspects may take the form of a hardware embodiment or an embodiment combining software and hardware. Some aspects may take the form of a computer program product that includes computer-useable or computer-executable instructions embodied on one or more computer-readable media.

Definitions

"Computer-readable media" can be any available media and may include volatile and non-volatile media, as well as removable and non-removable media. By way of example, and not limitation, computer-readable media may include computer storage media and communication media. Computer-readable media may include both volatile and non-volatile media, removable and non-removable media, non-transitory media, and may include media readable by a database, a switch, and various other network devices. Computer-readable media includes media implemented in any way for storing information. Examples of stored information include computer-useable instructions, data structures, program modules, and other data representations.

"Computer storage media" may include, without limitation, volatile and non-volatile media, as well as removable and non-removable media, and non-transitory computer storage media, implemented in any method or technology for the storage of information, such as computer-readable instructions, data structures, program modules, or other data. In this regard, computer storage media may include, but is not limited to, RAM, ROM, Electrically Erasable Programmable Read-Only Memory (EEPROM), flash memory or other memory technology, CD-ROM, DVD, holographic media, other optical disk storage, magnetic cassettes, magnetic tape, magnetic disk storage or other magnetic storage device, or any other medium that can be used to store the desired information and which may be accessed by the computing device 700 shown in FIG. 7. These technologies can store data momentarily, temporarily, or permanently.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner so as to encode information in the signal. By way of example, and not limitation, communication media includes wired media such as a wired network or direct-wired connection and wireless media such as acoustic, radio frequency (RF), infrared, and other wireless media. Combinations of any of the above may also be included within the scope of computer-readable media.

"Aerospace" is used herein to refer generally to the Earth's atmosphere and the outer space within the proximate vicinity of the Earth's atmosphere. In the context of an access point, the term "aerospace" is used to refer to a physical location of such an access point that is located within and/or orbiting within the Earth's atmosphere (e.g., in the thermosphere or exosphere) and/or the outer space within the proximate vicinity of the Earth's atmosphere, such that said physical location is not at or upon the Earth's surface.

"Network" refers to a network comprised of wireless and wired components that provide wireless communications service coverage, for example, to one or more user devices. For example, the network may include one or more, or a plurality of, wireless networks, hardwired networks, telecommunication networks, peer-to-peer networks, distributed networks, and/or any combination thereof. The network may comprise one or more access points, one or more cell sites (i.e., managed by an access point), one or more structures such as cell towers (i.e., having an antenna) associated with each access point and/or cell site, a gateway, a backhaul data center, a server that connects two or more access points, a database, a power supply, sensors, and other components not discussed herein, in various aspects. Examples of a network include a telecommunications network (e.g., 3G, 4G, 5G, and 6G. CDMA, CDMA 1XA, GPRS, EVDO, TDMA, GSM, LTE, and/or LTE Advanced) and/or a satellite network (e.g., Low Earth Orbit [LEO], Medium Earth Orbit [MEO], or geostationary). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMAX) network, and/or an ad-hoc (mesh) network. The network may include or may communicate with a physical location component for determining a geographic location of an item, package, parcel, personnel, vehicle, end-point location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity [SOP]).

"Access point" and "base station" are used interchangeably herein to reference hardware, software, devices, or other components for a communications device or structure having an antenna, an antenna array, a radio, a transceiver, and/or a controller. An access point can be deployed terrestrially at or near the Earth's surface, or within the atmosphere, for example, to orbit the Earth. For example, an "aerospace access point" may be a satellite deployed to orbit the Earth within or above the atmosphere (e.g., in the thermosphere or exosphere), whereas a "terrestrial access point" may be a fixed or semi-fixed base station located on the Earth's surface or upon any structure located on the surface. As discussed herein, an access point is a device comprised of hardware and complex software that is deployed in a network so that the access point can control and facilitate, via one or more antennas or antenna arrays, the broadcast, transmission, synchronization, and receipt of wireless signals in order to communicate with, verify, authenticate, and provide wireless communications service coverage to one or more user devices that request to join and/or are connected to the network. Generally, an access point can communicate directly with one or more user devices according to one or more access technologies (e.g., 3G, 4G, LTE, 5G, 6G, and mMIMO). An example of an aerospace access point includes a satellite. Examples of a terrestrial access point include a base station, eNodeB, a gNodeB, a macro cell, a small cell, a micro cell, a femto-cell, a pico-cell, and/or a computing device capable of acting as a wireless "hotspot" that enables connectivity to the network. Accordingly, the scale and coverage area of various types of access points are not limited to the examples discussed. Access points may work alone or in concert with one another, locally or remotely.

"Cell site" is generally used herein to refer to a defined wireless communications coverage area (i.e., a geographic area) serviced by an access point or a plurality of neighboring access points working together to provide a single coverage area. Also, it will be understood that one access point may control one cell site/coverage area, or, alternatively, one access point may control multiple cell sites/coverage areas.

"User equipment" (UE), "user device," "mobile device," and "wireless communication device" are used interchangeably to refer to a device having hardware and software that is employed by a user in order to send and/or receive electronic signals/communication over one or more networks, whether terrestrial or aerospace. User devices generally include one or more antennas coupled to a radio for exchanging (e.g., transmitting and receiving) transmissions with an in-range base station that also has an antenna or antenna array. In aspects, user devices may constitute any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The terms "radio," "controller," "antenna," and "antenna array" are used interchangeably herein to refer to one or more software and hardware components that facilitate sending and receiving wireless radio frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas having a length, for example, of ¼, ½, 1, or 1½ wavelengths. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Overview

Current aerospace access points use static frequency bandwidth that is assigned to neighboring beams. This static assignment may result in a primary beam operating with less than desirable bandwidth. When a primary beam has less than a desirable bandwidth, noise and/or other interference may adversely affect the communications between a user device and an aerospace access point. This may occur when one or more nearby user devices are also using neighboring beams to communicate with the aerospace access point or with nearby terrestrial access points.

To mitigate, prevent, and/or reduce the noise and/or other interference experienced between the user device and the aerospace access point, components operating within the terrestrial network control the use and non-use (e.g., determining and implementing "blanking" of antenna beams) when scheduling communications between the one or more nearby user devices and the one or more terrestrial access points. As discussed hereinafter, the one or more neighboring antenna beams that are selected can be temporarily blanked, based on traffic, in order to meet the bandwidth of the primary beam. The antenna beam blanking command may be directed by the network to the orbiting access point.

FIG. 1 depicts an example of a network environment 100, in accordance with one or more embodiments. The network environment 100 includes a server 102 having one or more processors. The server 102 operates within and thus is communicatively coupled to a telecommunications network 104 or its components. The server 102 is communicatively coupled to one or more base stations 106A, 106B, and 106C within the telecommunications network 104. Each of the one or more base stations 106A, 106B, and 106C has a corresponding coverage area 108A, 108B, and 108C. The one or more base stations 106A, 106B, and 106C can provide telecommunications services to one or more user devices 110A and 110B.

In the network environment 100 shown, the telecommunications network 104 interfaces with satellite network 112, which is also referred to as an aerospace network. In one aspect, the server 102 operates as, or is communicatively coupled to, a telecommunications core network component that acts as an interface between the satellite network 112 and the telecommunications network 104. The satellite network 112 can include one or more devices configured to act as aerospace access points, such as satellite 114. Although not shown, the satellite network 112 may interface with and communicate with one or more terrestrial radio elements that are not associated with the telecommunications network 104. The satellite 114 can provide connectivity to a user device 116 that is located within the coverage area 118 of the satellite 114.

In aspects, the user device 110A that is located within coverage area 108A communicates with the base station 106A, such that the base station 106A provides the user device 110A with connectivity to and services of the telecommunications network 104. The user device 110A may communicate with the base station 106A using Frequency Division Duplexing (FDD), in some aspects. In one such aspect, the user device 110A sends communications to the base station 106A over an uplink channel, using one or more particular radio frequencies designated for the uplink channel in accordance with FDD techniques. Meanwhile, the user device 116 that is located within the coverage area 118 may send communications to the satellite 114 over an uplink channel. These communications of the user device 116 may be transmitted using the same particular radio frequencies designated for the uplink channel, and which are being used by the user device 110A to communicate with the base station 106A. Due to the proximity and/or at least a partial overlap of the coverage area 118 of the satellite 114 with the coverage area 108A of the base station 106A, the use of the same radio frequencies by the user device 110B and the user device 110A can result in noise and/or other interference on the uplink channel. For example, the satellite 114 may detect, measure, and/or determine that noise and/or interference is occurring based on one or more communications between the user device 110A and the satellite 114 over the uplink channel. The amount or level of noise and/or interference may be detected, measured, and/or determined by the user device 116 and reported to the satellite 114, in some instances.

Figure 2:
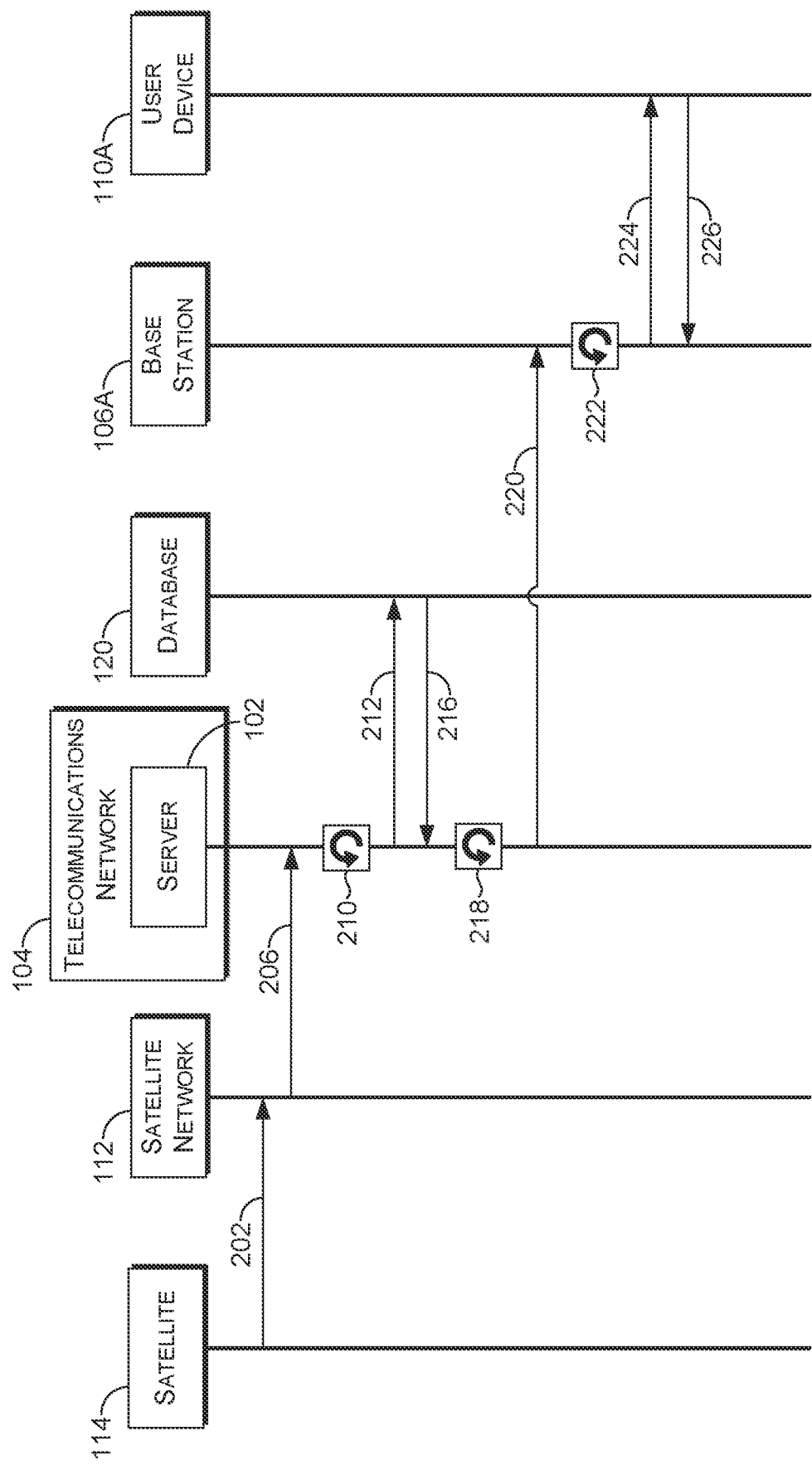
FIG. 2 depicts a diagram of communications in a network, in accordance with one or more embodiments.

As shown in the diagram 200 of FIG. 2, based on the noise and/or other interference (referred to hereinafter as "noise" for brevity) that is detected, measured, determined, and/or identified by the satellite 114 in communication with a user device, such as the user device 116, a degradation indicator can be generated and communicated 202 by the satellite 114 via the satellite network 112. The degradation indicator can further be communicated 206 through the satellite network 112 to the telecommunications network 104, where the server 102 is located. In various aspects, the degradation indicator can include or specify a unique identifier that particularly identifies and distinguishes the satellite 114 from other satellites and/or terrestrial access points. As such, the server 102 can receive the degradation indicator, which may be specific to an uplink channel between the user device 110A and the satellite 114. The degradation indicator can identify the satellite 114 and/or specify specifications and configurations of the satellite 114, in aspects. In addition, the degradation indicator can identify the antenna beams used as well as a primary antenna beam. The degradation indicator may also specify the bandwidth used by the primary antenna beam. The degradation indicator can, in various aspects, identify the satellite network 112 and/or specify specifications and configurations of the satellite network 112. In some aspects, the degradation indicator can identify and/or specify a unique identifier that particularly identifies and distinguishes the user device 116 from other user devices, such as user devices 110A, 110B, and 110C. The degradation indicator can specify specifications and configurations of the user device 110A, in aspects. Additionally, in some aspects, the degradation indicator can specify a value (e.g., numerical) for the noise and/or other interference, such as a measurement that captures or quantifies the noise measured by the user device and/or the satellite, in various aspects. For example, any value in the range of −10 and +40 decibels (dB) could be utilized and included in the degradation indicator to quantify or represent the signal quality of the uplink channel, for which noise is detected. Additionally or alternatively, the degradation indicator can indicate and/or specify that the noise measurement is determined to be less than, meet, or exceed a particular threshold or threshold value for noise.

In response to receipt of the degradation indicator and/or information encoded therein, the server 102 can determine 210 whether a signal quality of the uplink channel between the user device 110A and the satellite 114 does not meet a threshold based on the degradation indicator. When the signal quality of the uplink channel between the user device 110A and the satellite 114 does not meet a threshold based on the degradation indicator, the server 102 can further determine to implement actions that mitigate, prevent, and/or reduce uplink interference. The actions that may be taken may include identifying a number of users using a particular antenna beam and a threshold number of users may determine whether dynamic beam blanking should be implemented. Dynamic beam blanking may also be implemented when a signal quality of the uplink channel does not meet a threshold based on the degradation indicator.

The server 102 generates and communicates 214 a query to a database 120 that is communicatively available or accessible via one or more of the telecommunications network 104 and/or satellite network 112. The server 102 may, for example, input a unique identifier specified in the degradation indicator and the current date and time (e.g., a date and time/a timestamp that is associated with the generation of and/or the server's receipt of the degradation indicator), which together, act as a query string for locating data that specifically corresponds to the satellite 114. In such an example, the unique identifier may be utilized as, or can itself act as, a query. This query can be used to particular identify the satellite 114, the satellite network 112 in which the satellite 114 is operating, configurations of the satellite 114 and/or the satellite network 112, or any combination thereof. The unique identifier may also particularly identify the antenna beam used for communications.

The database 120 stores a plurality of unique satellite identifiers, and each unique satellite identifier is linked to or stored in association with a detailed trajectory path for that particular satellite. A trajectory path includes a plurality of geographic surface areas or locations, which can correspond to coverage areas of that satellite, as well as the dates and times at which the satellite's overhead travel above the Earth corresponds to those particular geographic surface areas. In various aspects, the detailed trajectory path data includes projected paths with full sequences of future dates and times. As such, the database 120 stores a plurality of travel trajectories for various satellites, and the trajectories to be traveled by those satellites determines the plurality of coverage areas of each satellite at specific, corresponding dates and times. Based on a particular combination of date and time, the database 120 stores the geographic surface area for which the satellite 114 can provide communications coverage to user device(s) that is/are located within or at the edge of said geographic surface area on that date and at that time. In addition, based on the geographic surface area of the satellite a number of antenna beams may be available to serve the geographic surface area.

Additionally, the database 120 stores the geographic locations for a plurality of base stations, for example, as longitude and latitude coordinates. The geographic location may refer to the physical location of a cell tower associated with the base station and/or may correspond to all or a portion of a coverage area of the base station. The base stations may be stored in groups, each grouping being associated with each other based on the base stations' proximity to each other, proximity to one or more geographic surface areas in the trajectories of one or more satellites, locations within (or at the edge of) of more geographic surface areas in the trajectories of one or more satellites, and/or any combination thereof. For example, one grouping may include one or more base stations that are located within a specific geographic surface area that corresponds to a particular satellite's coverage area on a particular date and at a specific time. It will be understood that any base station may be part of more than one grouping, for any quantity of various satellites and their trajectories, based on the base station's location relative to the distinct trajectories of different satellites and those corresponding coverage areas.

As such, by querying the database using the unique identifier for the satellite and a current date and time, results are returned 216 from the database 120 to the server. Based on the returned results, the server 102 can identify one or more antenna beams to be used for implementing dynamic beam blanking. The one or more antenna beams may be identified as having a number of users that is greater or less than a usage threshold. Antenna beams with a number of users greater than the usage threshold retain the already assigned antenna beams and may also be assigned additional antenna beams to increase the bandwidth of the primary antenna beam. In contrast, antenna beams with a number of users less than the usage threshold may blanked, with those antenna beams reallocated to a primary antenna beam. Users of the antenna beams with below threshold numbers of users may be reassigned to other antenna beams or may be reassigned to the primary antenna beam. Dynamic beam blanking may vary through the use of different usage thresholds and degradation indicators, based on the geographical area. The server 102 determines that implementing dynamic beam blanking interference for the identified antenna beams is predicted to increase beamwidth of the primary antenna beam and reduce noise and/or other interference that the base stations or user devices in communications therewith are causing on the uplink channel between the user device 110A and the satellite 114.

The server 102 can then generate 218 computer-readable instructions for the one or more base stations. In order to reduce uplink interference, the computer-readable instructions may specify and/or instruct each of the one or more of the aerospace access points to dynamically blank one or more antenna beams on the uplink between other user device(s) and the aerospace access point. The quantity of antenna beams to be dynamically blanked by the server 102 may be determined using a degradation indictor or usage threshold. The quantity of antenna beams to be blanked may be customized for each of a plurality of aerospace access points and terrestrial access points to receive the instructions, in some aspects, depending on the traffic load at each specific access point, in some aspects. In various aspects, the computer-readable instructions may specify a time duration for which the antenna beams are to be blanked, upon which the lapse of that time duration, the blanking technique can be discontinued once the need for bandwidth enhancement of the primary beam has ended.

The server 102 communicates 220 the computer-readable instructions to the base station 106A directly or indirectly through the telecommunications network 104. The computer-readable instructions cause, as shown in the example of FIG. 2, the base station 106A to schedule instructions for and communicate 224 with the user device 110A, via the downlink, in a manner that follows and adheres to the computer-readable instructions for blanking at least one antenna beam to provide additional bandwidth for the primary antenna beam. Then, the user device 110A will adhere to the scheduling designations provided, and the user device 110A will automatically blank the one or more antenna beams when communicating 226 on the uplink channel with the base station 106A.

By automatically blanking one or more antenna beams when the user device 110A communicates with the base station 106A using all or some portion of the same radio frequencies utilized by the user device 110A when communicating with the satellite 114, noise and/or other interference that is caused by the user device 110A and experienced on the uplink channel between the satellite 114 and the user device 110A is reduced or mitigated.

Having described the system 100 and components thereof, it will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing communication links between the components shown in FIG. 1, may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should be not be interpreted as limiting the present invention to exclude additional components and combination(s) of components. Moreover, though components are represented in FIG. 1 as singular components, it will be appreciated that some aspects may include a plurality of devices and/or components such that FIG. 1 should not be considered as limiting the number of any of the depicted devices or components.

Figure 3:
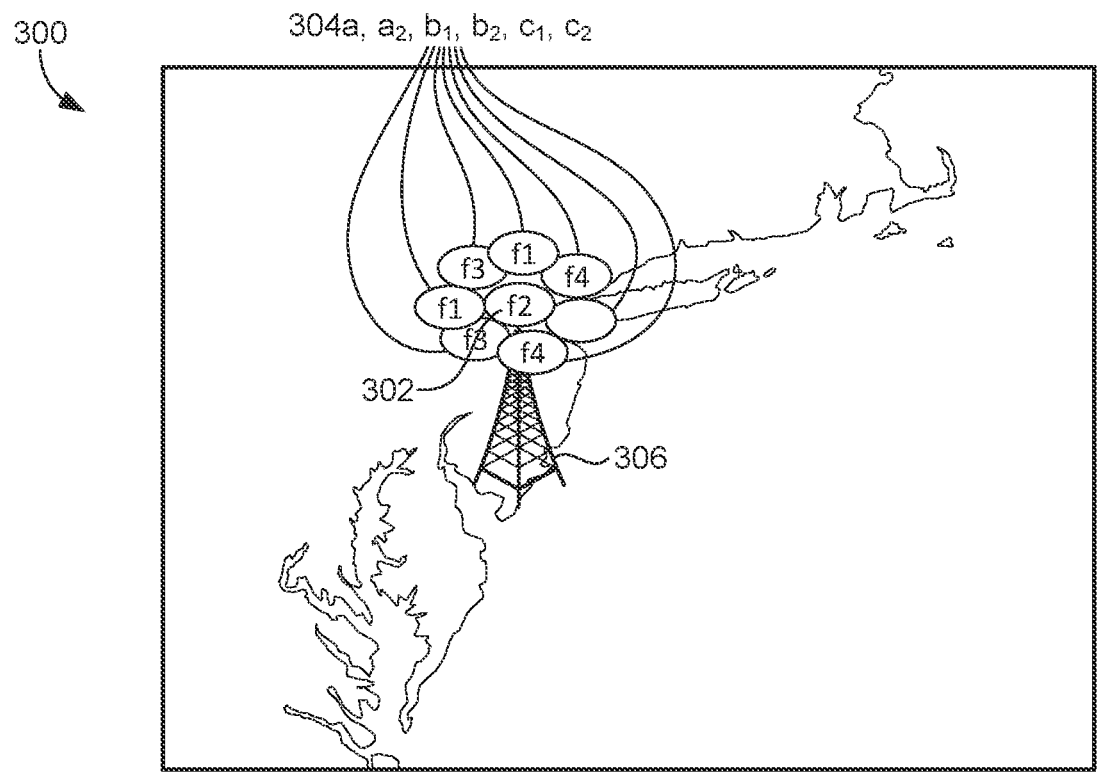
FIG. 3 depicts dynamic beam blanking and spectrum reservation for direct to cell mobile satellite communications, in accordance with one or more embodiments.

FIG. 3 depicts dynamic beam blanking and spectrum reservation for direct to cell mobile satellite communications, in accordance with one or more embodiments. In FIG. 3 a geographic area 300 is served by multiple antenna beams. A primary antenna beam 302 uses beam f2. The primary antenna beam 302 may be supplemented if a degradation indicator or a usage threshold indicates that the primary antenna beam 302 does not have sufficient bandwidth to serve UEs in geographic area 300. The degradation indicator may indicate that the primary antenna beam 302 is suffering from interference from adjacent beams or is at the edge of geographic area 300, where service through an aerospace access point may need additional bandwidth.

The additional bandwidth may be provided by dynamic blanking of adjacent antenna beams 304 a1, a2, b1, b2, c1, and c2. The antenna beams 304 a1 and a2 may be antenna beams f1, with two antenna beams f1. Similarly, antenna beams 304 b1 and b2 may be antenna beams f3 and antenna beams 304 c1 and c2 may be antenna beams f4. When an antenna beam 304 is blanked the blanked antenna beam is used to supplement the primary antenna beam 302. For example, antenna beams 304 b1 and b2 are f3 beams are dynamically blanked on the uplink channel and other UEs and a serving base station 306. The antenna beams 304 b1 and b2 add to the bandwidth of primary antenna beam 302. The aerospace access point dynamically blanks antenna beams 304 b1 and b2 based on instructions that may be communicated by a terrestrial base station or may be determined on the aerospace access point.

In addition to the degradation indicator, a usage threshold may also be used to determine the need for dynamic antenna beam blanking. The usage threshold may indicate that the primary antenna beam 302 has a number of users above the usage threshold. When this occurs the bandwidth of the primary antenna beam 302 may be insufficient to serve this number of users. When this occurs, additional antenna beams, such as antenna beams 304 b1 and b2, may be dynamically assigned to the primary antenna beam 302. Antenna beams 304 b1 and b2 may be dynamically blanked from other users in geographic area 300 when reassigned to primary antenna beam 302.

Alternatively, the usage threshold may also be used to determine if antenna beams 304 are available for dynamic beam assignment to the primary antenna beam 302. For example, antenna beams 302 c1 and c2 may have few to no users, making them more readily available for dynamic beam blanking. UEs that are assigned to antenna beams 302 c1 and c2 may be reassigned to other antenna beams or may be reassigned to terrestrial base stations.

Figure 4:
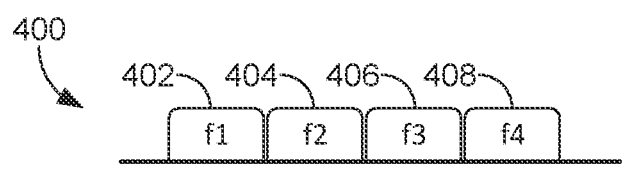
FIG. 4 depicts dynamic beam blanking and spectrum reservation for direct to cell mobile satellite communications, in a network, in accordance with one or more embodiments.

FIG. 4 depicts dynamic beam blanking and spectrum reservation for direct to cell mobile satellite communications, in a network, in accordance with one or more embodiments. The dynamic spectrum assignment 400 initially includes a primary beam 404 f2, with antenna beam 402 f1 assigned to other UEs. Antenna beam 406 f3 and antenna beam 408 f4 are also assigned to other UEs. The primary antenna beam 404 f2 may be determined to need additional bandwidth and antenna beam 406 f3 is dynamically blanked and reassigned to primary antenna beam 404 f2. After dynamic beam blanking primary antenna beam 402 now has both f1, originally assigned, and antenna beam 406 f3.

Figure 5:
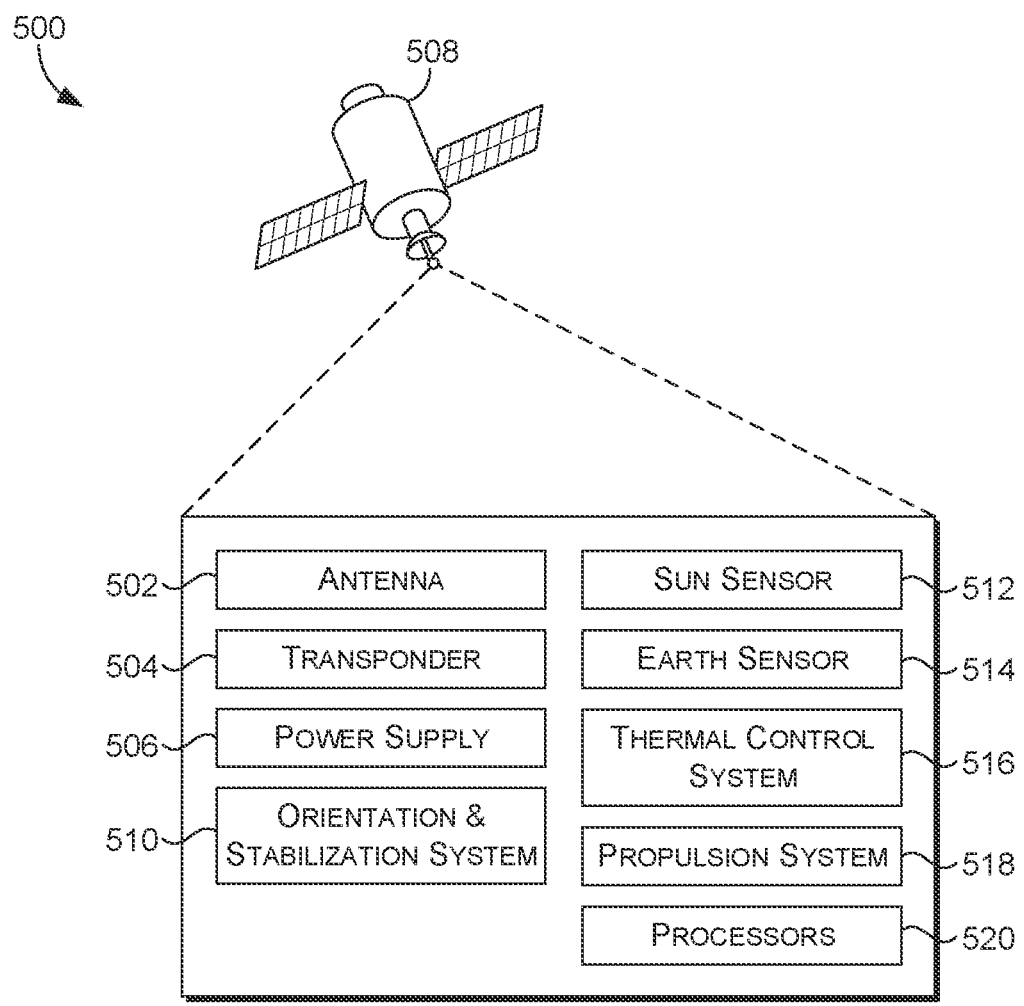
FIG. 5 is a diagram of an example aerospace access point, in accordance with one or more embodiments.

FIG. 5 provides a diagram of an example aerospace access point 100 and/or system for use in implementations of the present disclosure. The aerospace access point 100, such as a satellite, may include an antenna 502, a transponder 504, a power supply 506, and a housing 508, in aspects. The aerospace access point 100 can further include one or more of an orientation and stabilization system 510, a sun sensor 512, an Earth sensor 514, a thermal control system 516, a propulsion system 518, one or more processors 520, or any combination thereof.

The antenna 502, as previously described herein, may comprise one or more antennas. For example, the aerospace access point 100 can include a command antenna and a communication antenna. As such, the aerospace access point 100 can utilize a command antenna when communicating for telemetry and tracking, while using the communication antenna to receive uplink and/or downlink communications from terrestrial devices, such as a user device, satellite dish, and/or base station.

The transponder 504 comprises hardware that operates as a transmitter-receiver system for processing and modifying radio frequencies based on receiving signals and/or transmitting signals using one or more antennas. In various aspects, the aerospace access point 100 may include a plurality of transponders. Transponders can include subcomponents, for example, such as a duplexer, noise amplifiers (e.g., low noise amplifier), processors (e.g., carrier processors), power amplifiers, filters, frequency converters, oscillators, modulators, and/or any combination or quantity thereof.

The power supply 506 operates to provide power to the aerospace access point 500 and the aerospace access point components. The power supply 506 can include one or more components for capturing, storing, releasing, and/or controlling the flow of power to provide power for the operations of the aerospace access point components. Examples of a power supply include a battery or a solar panel or array.

The housing 508 is a physical structure that encloses or physically protects components of the aerospace access point 500. A solar array and/or antennas may be positioned outside or may be attached to a housing, whereas processors and thermal control systems may be housed within the housing 508.

The orientation and stabilization system 510 is configured to stabilize the aerospace access point 500, such as spin stabilization and/or three-axis (e.g., yaw axis, roll axis, and pitch axis) stabilization. The orientation and stabilization system 510 can include or utilize the sun sensor 512 and/or the Earth sensor 514 in various aspects. The orientation and stabilization system 510 can also communicate with and provide instructions to the propulsion system 518 in order to modify the positon and orientation of the aerospace access point 500, or specific components, such as a solar array or antenna(s). For example, the orientation and stabilization system 510 can, via sensors, detect spin or rotation and utilize the propulsion system 518 (e.g., thrusters) to modify or control the speed of rotation (e.g., the speed by which the aerospace access point 500 is spinning around its own central, vertical axis) in order to stabilize the aerospace access point 500. The orientation and stabilization system 510 can include one or more momentum wheels or reaction wheels, driven by motors, and which are mounted on three perpendicular axes (e.g., yaw axis, roll axis, and pitch axis).

The sun sensor 512 is a navigational sensor configured to detect the direction and position of the sun, and to determine the orientation of the aerospace access point with respect to the sun. The sun sensor 512 can further be configured to provide positional information and data that can be used to align a power supply system component, such as a solar array, to capture light. The Earth sensor 514 is a navigational sensor configured to detect the direction and position of the Earth (e.g., detection of light at or near the Earth's horizon when in orbit), and to determine orientation of the aerospace access point 500 with respect to the Earth. The Earth sensor 514 can provide positional information and data that can be used to determine orientation to the Earth's edge, for example, which may be used to determine roll angle and pitch.

The thermal control system 516 regulates and/or maintains optimized temperatures that ensure proper functioning of the aerospace access point 500 and the aerospace access point components. Examples of thermal control systems include thermoelectric coolers, heaters, fluid loop systems, and the like.

The propulsion system 518 operates to modify the position, orientation, pitch, and/or angle of the aerospace access point 500 and any components located on the exterior of the housing 508 of the aerospace access point 500, when the aerospace access point 500 is in orbit. The propulsion system 518 can be an "in-space" propulsion system that can rely on and utilize chemical propulsion, electric propulsion, and/or propellant-less propulsion. The propulsion system 518 can include, for example, thrusters, jets, solar sails, electrodynamic tethers, aerodynamic drag devices, monopropellant systems, bipropellant systems, hybrid propellants, cold/warm gas propellants, liquid propellants, solid propellants, electrothermal propulsion, electrospray propulsion, gridded ion propulsion, Hall-effect propulsion, pulsed plasma propulsion, vacuum arc propulsion, ambipolar propulsion, and any combination thereof. The propulsion system 518 may be controlled by processors and/or can work in tandem with or as a subsystem of the orientation and stabilization system 510, in various aspects.

Figure 6:
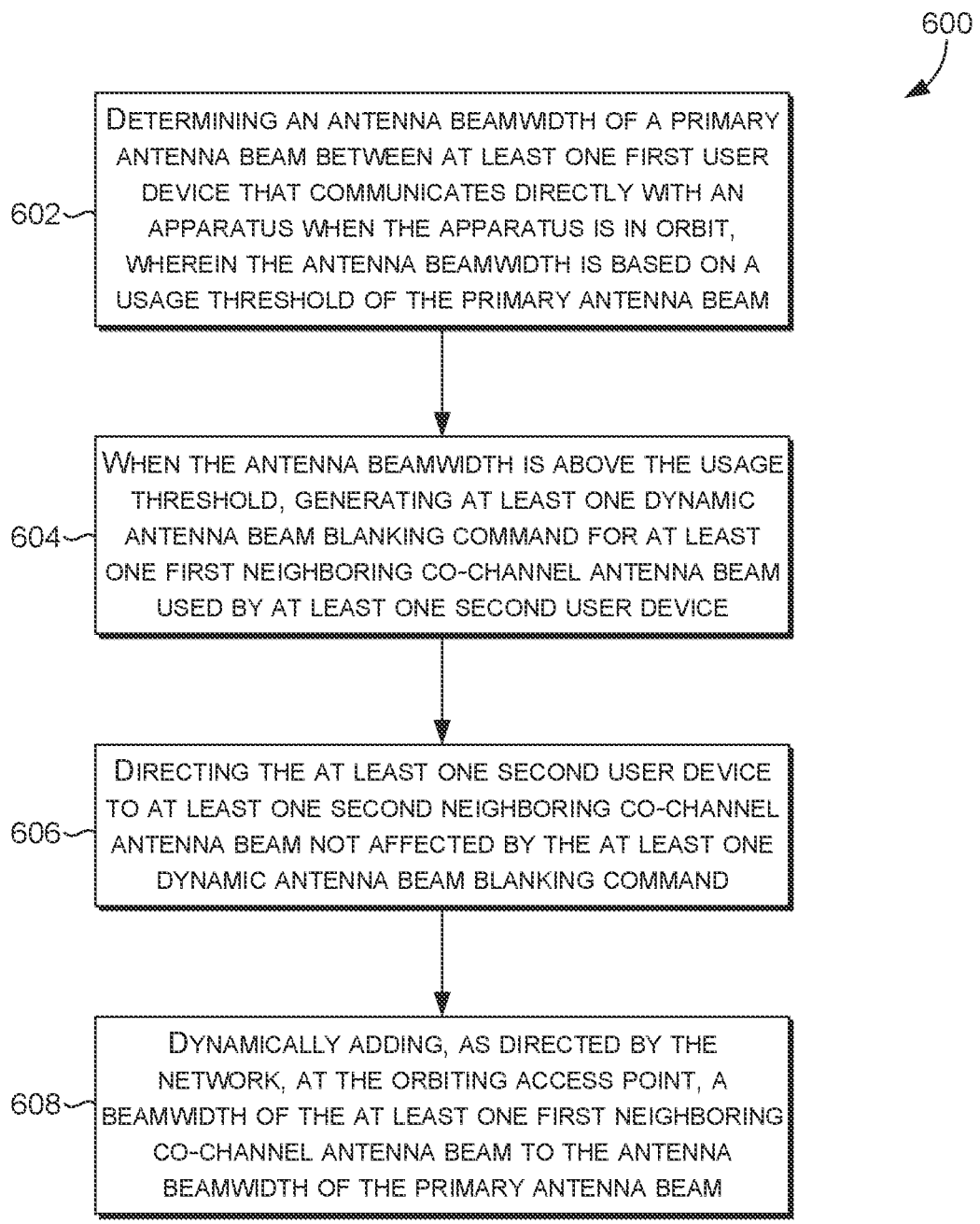
FIG. 6 is a flow diagram of a method of dynamic beam blanking and spectrum reservation for direct to cell mobile satellite communications, in accordance with one or more embodiments.

The one or more processors of the aerospace access point 500 can be utilized by and can support any or all of the components and subsystems discussed above, and can perform any and all aspects described with regard to the method 600 of FIG. 6. As such, the one or more processors are specially configured to determine the degradation indicator and a usage threshold between a user device that communicates directly with the aerospace access point 500 using an uplink channel, when the aerospace access point 500 is in orbit. The processor(s) may further generate a degradation indicator that includes a unique identifier of the aerospace access point 500 and that indicates that the uplink quality of the uplink channel is below a threshold, in response to determining that the uplink quality is below the threshold. The usage threshold may be determined by counting a number of UEs on a primary antenna beam or alternatively, a number of UEs on a different antenna beam adjacent to the primary beam. The aerospace access point 500 may communicate the number of UEs on the primary antenna beam or the number of UEs on the different antenna beams adjacent to the primary beam. Alternatively, a terrestrial base station may communicate the number of UEs on the different antenna beams and the primary antenna beam to the aerospace access point.

FIG. 6 is a flow diagram of a method of dynamic beam blanking and spectrum reservation for direct to cell mobile satellite communications, in accordance with one or more embodiments. The method 600 begins at step 602 with determining an antenna beamwidth of a primary antenna beam between at least one first user device that communicates directly with an apparatus when the apparatus is in orbit. The antenna beamwidth is based on a usage threshold of the primary antenna beam. The method continues with step 604 when the antenna beamwidth is above the usage threshold, generating at least one dynamic antenna beam blanking command for at least one first neighboring co-channel antenna beam used by at least one second user device. The method then proceeds in step 606 with directing the at least one second user device to at least one neighboring co-channel antenna beam not affected by the at least one dynamic antenna beam blanking command. The method then concludes with step 608, dynamically adding, as directed by the network, at the orbiting access point, a beamwidth of at least one first neighboring co-channel antenna beam to the antenna beamwidth of the primary antenna beam.

The usage threshold of the primary antenna beam may be based on a predetermined number of user devices using the primary antenna beam. The predetermined number of users may be selected to direct antenna beam blanking when communications with the aerospace access point are likely to become degraded due to the number of user devices accessing the network through the primary antenna beam. Alternatively, a degradation indicator for the primary antenna beam may be determined. The degradation indicator may be used when at least one signal condition indicator of the primary antenna beam is below a predetermined signal condition threshold. The signal condition threshold may use common measures of the antenna signal quality such as RSRP, SINR, and similar metrics.

A further method of dynamic beam blanking may also be provided. A user device may transmit at least one uplink message to an aerospace access point. The uplink message may be transmitted using a primary antenna beam. The user device may then receive a dynamic beam blanking instruction from the aerospace access point to add at least one neighboring co-channel antenna beam to the primary antenna beam. The degradation indicator or a predetermined usage threshold of the primary antenna beam may be used to determine when a dynamic beam blanking command should be issued. A signal condition report sent by the user device may include at least one signal condition report and may be the basis for the issuing of the dynamic antenna beam blanking command. The dynamic beam blanking command may be used when the signal condition report is below a predetermined threshold value. In some instances, the user device may be instructed to move from the primary antenna beam to a terrestrial base station by the dynamic antenna beam blanking command. The user device may also be directed to move from the primary antenna beam to at least one neighboring co-channel antenna beam.

Figure 7:
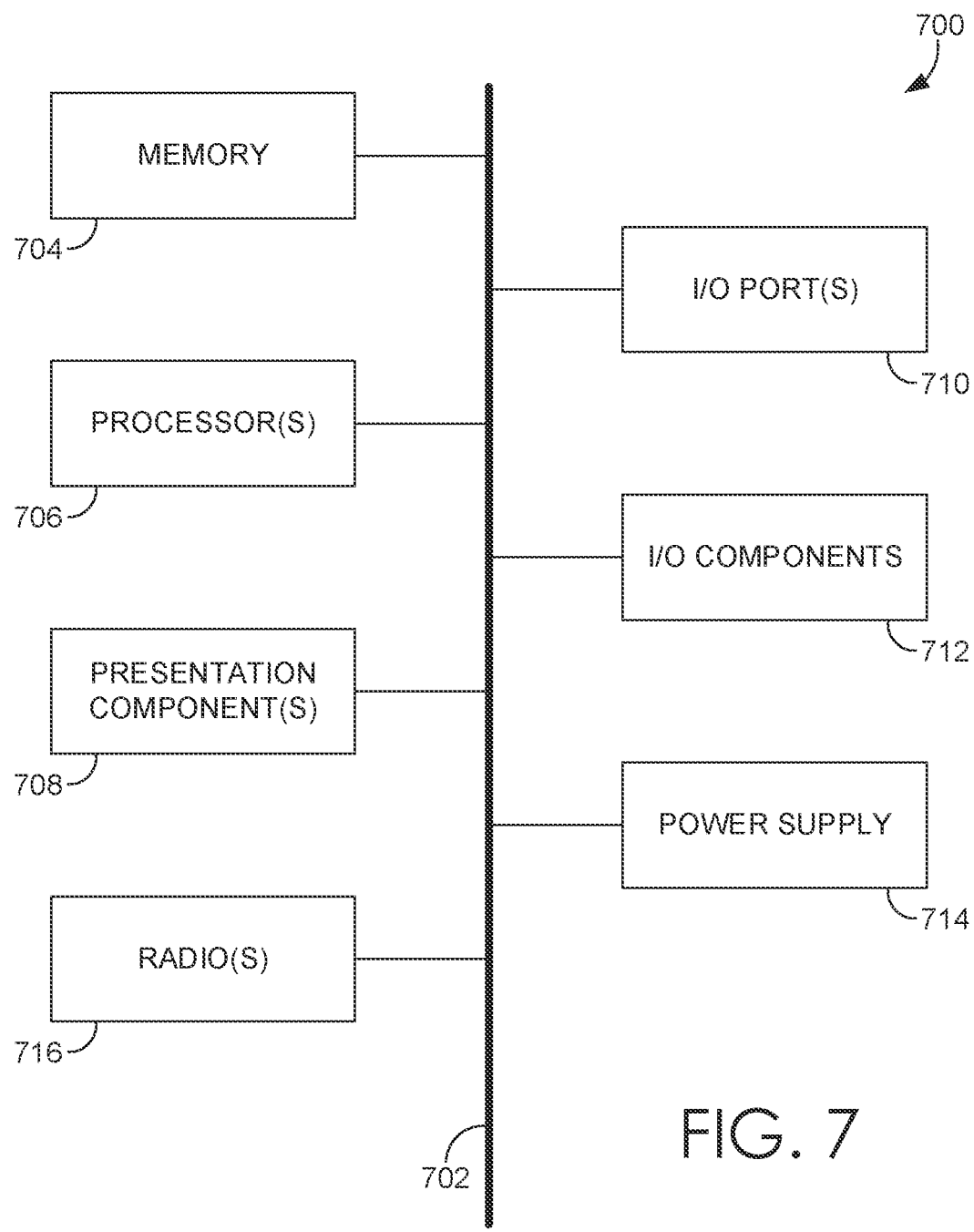
FIG. 7 illustrates an example computing device suitable for use in implementations of the present disclosure.

Turning now to FIG. 7, a diagram is depicted of another example computing device suitable for use in implementations of the present disclosure. Computing device 700 is but one example of a suitable computing environment and is not intended to suggest any limitation as to the scope of use or functionality of the invention, and nor should computing device 700 be interpreted as having any dependency or requirement relating to any one or combination of components illustrated.

The implementations of the present disclosure may be described in the general context of computer code or machine-useable instructions, including computer-executable instructions such as program components being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 702 that directly or indirectly couples with the following devices: memory 704, one or more processors 706, one or more presentation components 708, input/output (I/O) ports 710, I/O components 712, and power supply 714. Bus 702 represents what may be one or more buses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component such as a display device to be one of I/O components 712. Also, processors, such as one or more processors 706, have memory. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information, such as computer-readable instructions, data structures, program modules or other data.

Computer storage media includes RAM, ROM, EEPROM, flash memory or other memory technology, CD-ROM, digital versatile disks (DVDs) or other optical disk storage, magnetic cassettes, magnetic tape, and magnetic disk storage or other magnetic storage devices. Computer storage media does not comprise a propagated data signal.

Communication media typically embodies computer-readable instructions, data structures, program modules or other data in a modulated data signal (such as a carrier wave or other transport mechanism), and includes any information delivery media. The term "modulated data signal" indicates a signal that has one or more of its characteristics set or changed in such a manner so as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 704 includes computer storage media in the form of volatile and/or non-volatile memory. Memory 704 may be removable, non-removable, or a combination thereof. Examples of memory include solid-state memory, hard drives, optical disc drives, etc. Computing device 700 includes one or more processors 706, which read data from various entities such as bus 702, memory 704, or I/O components 712. One or more presentation components 708 present data indications to a person or other device. Examples of one or more presentation components 708 include a display device, speaker, printing component, vibrating component, etc. I/O ports 710 allow computing device 700 to be logically coupled to other devices including I/O components 712, some of which may be built in computing device 700. Illustrative I/O components 712 include a microphone, joystick, game pad, satellite dish, scanner, printer, wireless device, etc.

Radio 716 represents a radio that facilitates communication with a wireless telecommunications network. Illustrative wireless telecommunications technologies include CDMA, GPRS, TDMA, GSM, and the like. Radio 716 might additionally or alternatively facilitate other types of wireless communications including Wi-Fi, WiMAX, LTE, or other VoIP communications. As can be appreciated, in various aspects the radio 716 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some aspects.

Many different arrangements of the various components depicted, as well as components not shown, are possible without departing from the scope of the claims below. Aspects of our technology have been described with the intent of being illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method of dynamic beam blanking in a network, the method comprising:
   determining a primary antenna beamwidth of a primary antenna beam for communication between at least one first user device and an orbiting access point, wherein the antenna beamwidth is based on a usage of the primary antenna beam exceeding a predetermined traffic threshold;
   generating at least one dynamic antenna beam blanking command for at least one first neighboring co-channel antenna beam based on the primary antenna beamwidth exceeding the predetermined traffic threshold;
   transmitting the at least one dynamic antenna beam blanking command for the at least one first neighboring co-channel antenna beam to the orbiting access point;
   dynamically adding, as directed by the network, at the orbiting access point, a beamwidth of the at least one first neighboring co-channel antenna beam to the antenna beamwidth of the primary antenna beam.

2. The method of claim 1, wherein the predetermined traffic threshold of the primary antenna beam is based on a predetermined number of user devices using the primary antenna beam.

3. The method of claim 2, wherein the at least one dynamic antenna beam blanking command is issued when a number of users of the primary antenna beam exceeds the predetermined number of user devices using the primary antenna beam.

4. The method of claim 1, further comprising determining a degradation indicator for the primary antenna beam.

5. The method of claim 4, wherein the degradation indicator indicates that at least one signal condition indicator of the primary antenna beam is below a predetermined signal condition threshold.

6. The method of claim 5, further comprising generating the at least one dynamic antenna beam blanking command based on the degradation indicator.

7. The method of claim 1, wherein the at least one dynamic antenna beam blanking command turns off the at least one neighboring co-channel antenna beam while the antenna beamwidth of the at least one neighboring co-channel antenna beam is added to the antenna beamwidth of the primary antenna beam.

8. The method of claim 1, wherein the at least one first neighboring co-channel antenna beam selected for blanking has the lowest traffic.

9. The method of claim 8, wherein the lowest traffic is based on a number of user devices.

10. A method of dynamic beam blanking in a network, the method comprising:
    transmitting, by a user device, to an orbiting access point, at least one uplink message using a neighboring co-channel antenna beam; and
    receiving, by the user device, a dynamic beam blanking instruction from the orbiting access point, to cease using the neighboring co-channel antenna beam.

11. The method of claim 10, wherein the dynamic beam blanking instruction is based on a number of user devices using a primary antenna beam exceeding a predetermined usage threshold.

12. The method of claim 10, wherein the dynamic beam blanking instruction is based on a degradation indicator of a primary antenna beam.

13. The method of claim 12, wherein the degradation indicator is based on at least one signal condition report sent by the user device using the primary antenna beam.

14. The method of claim 13, wherein the at least one signal condition report reports at least one signal condition of the primary antenna beam below a predetermined threshold value.

15. A non-transitory computer storage media storing computer-usable instructions that, when used by one or more processors, cause the processors to:
    determine an antenna beamwidth of a primary antenna beam for communication between at least one first user device and an orbiting access point, wherein the antenna beamwidth is based on a usage of the primary antenna beam exceeding a predetermined traffic threshold;
    generate at least one dynamic antenna beam blanking command for at least one first neighboring co-channel antenna beam based on the primary antenna beamwidth exceeding the predetermined traffic threshold;
    transmit the at least one dynamic antenna beam blanking command for at least one first neighboring co-channel antenna beam to the orbiting access point;
    dynamically add, as directed by the network, at the orbiting access point, a beamwidth of the at least one first neighboring co-channel antenna beam to the antenna beamwidth of the primary antenna beam.

16. The non-transitory computer storage media of claim 15, wherein the predetermined traffic threshold of the primary antenna beam is based on a predetermined number of user devices using the primary antenna beam.

17. The non-transitory computer storage media of claim 16, wherein the at least one dynamic beam blanking command is issued when a number of users of the primary antenna beam exceeds the predetermined number of user devices using the primary antenna beam.

18. The non-transitory computer storage media of claim 15, further comprising determine a degradation indicator for the primary antenna beam.

19. The non-transitory computer storage media of claim 18, wherein the degradation indicator indicates that at least one signal condition indicator of the primary antenna beam is below a predetermined signal condition threshold.

20. The non-transitory computer storage media of claim 19, further comprising generating the at least one dynamic antenna beam blanking command based on the degradation indicator.

* * * * *